(12) United States Patent
Ford et al.

(10) Patent No.: US 7,324,955 B1
(45) Date of Patent: Jan. 29, 2008

(54) GENERATING A SALES VOLUME FORECAST

(75) Inventors: Charles P. Ford, Dallas, TX (US); Wei Cao, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1101 days.

(21) Appl. No.: 10/103,342

(22) Filed: Mar. 19, 2002

Related U.S. Application Data

(60) Provisional application No. 60/356,379, filed on Feb. 11, 2002.

(51) Int. Cl.
*G06F 17/30* (2006.01)
(52) U.S. Cl. .................................... 705/10
(58) Field of Classification Search ............... 705/10, 705/37
See application file for complete search history.

(56) References Cited

U.S. PATENT DOCUMENTS

| | | | |
|---|---|---|---|
| 5,128,861 A * | 7/1992 | Kagami et al. ............ | 705/10 |
| 5,299,115 A * | 3/1994 | Fields et al. .............. | 705/10 |
| 5,377,095 A * | 12/1994 | Maeda et al. ............. | 705/10 |
| 5,832,456 A * | 11/1998 | Fox et al. ................. | 705/10 |
| 6,032,125 A * | 2/2000 | Ando ......................... | 705/10 |
| 6,393,406 B1 * | 5/2002 | Eder ........................... | 705/7 |
| 6,976,001 B1 * | 12/2005 | Levanoni et al. ........ | 705/10 |
| 7,072,863 B1 * | 7/2006 | Phillips et al. ............ | 703/2 |
| 7,133,848 B2 * | 11/2006 | Phillips et al. ............ | 705/400 |
| 7,197,474 B1 * | 3/2007 | Kitts ........................... | 705/10 |
| 7,246,079 B2 * | 7/2007 | Ando et al. ................. | 705/10 |

OTHER PUBLICATIONS

Gardner, Bruce L. "Futures Prices in Supply Analysis." American Journal of Agricultural Economics, vol. 58, No. 1 (Feb. 1976), pp. 81-84.*
Peck, Anne E. "Futures Markets, Supply Response, and Price Stability." The Quarterly Journal of Economics, vol. 90, No. 3. (Aug. 1976), pp. 407-423.*
Tam, Pui-Wing. (Jan. 4, 2001). Apple Cuts Prices to Get Products Off the Shelves—Inventory Level Worries Computer Maker. The Asian Wall Street Journal, p. N.2.*
Jane E. Lapin "A Primer in Consumer Marketing", Mar. 1994, Reasearch and Special Program Administration, pp. 1-100.*

* cited by examiner

*Primary Examiner*—Romain Jeanty
(74) *Attorney, Agent, or Firm*—Booth Udall, PLC

(57) ABSTRACT

A method for generating a sales volume forecast includes receiving user input specifying a hypothetical asking price and a future date and accessing, for each of multiple past time periods, historical data reflecting a sales volume for an item over the past time period and a corresponding price difference between an asking price and a coinciding market price for the item, the price difference also being associated with the past time period. The method also includes determining a historical correlation for the item between sales volume and price difference between asking price and coinciding market price, accessing market data reflecting a future market price for the item associated with the specified future date, determining a price difference between the specified hypothetical asking price and the future market price for the item, applying the determined historical correlation to the determined price difference to generate a sales volume forecast, and providing the generated sales volume forecast for access by a user.

29 Claims, 1 Drawing Sheet

GENERATING A SALES VOLUME FORECAST

CROSS-REFERENCE TO RELATED APPLICATION

This application claims the benefit under 35 U.S.C. § 119 of U.S. Provisional Application No. 60/356,379, filed Feb. 11, 2002.

TECHNICAL FIELD OF THE INVENTION

This invention relates generally to business planning and more particularly to generating a sales volume forecast.

BACKGROUND OF THE INVENTION

Forecasting the volume of sales for one or more items may be an important part of business planning. For example, an enterprise may forecast the volume of sales for an item at different asking prices to determine a suitable asking price for the item. As another example, an enterprise may forecast the volume of sales for different items to determine how resources should be allocated for the manufacturing of those items. Traditionally, systems for making such forecasts have compared historical asking price increases, historical asking price decreases, historical offered discounts, and other historical "events" on the part of an enterprise with historical sales volumes for that enterprise to forecast the volume of sales for that enterprise. However, the accuracy of such forecasts has been limited.

SUMMARY OF THE INVENTION

According to the present invention, disadvantages and problems associated with previous sales volume forecasting techniques may be substantially reduced or eliminated.

In one embodiment of the present invention, a method for generating a sales volume forecast includes receiving user input specifying a hypothetical asking price and a future date. The method also includes accessing, for each of multiple past time periods, historical data reflecting a sales volume for an item over the past time period and a corresponding price difference between an asking price and a coinciding market price for the item, the price difference also being associated with the past time period. The method also includes determining a historical correlation for the item between sales volume and price difference between asking price and coinciding market price, accessing market data reflecting a future market price for the item associated with the specified future date, determining a price difference between the specified hypothetical asking price and the future market price for the item, applying the determined historical correlation to the determined price difference to generate a sales volume forecast, and providing the generated sales volume forecast for access by a user.

Particular embodiments of the present invention may provide one or more technical advantages. Particular embodiments may provide sales volume forecasts that take into account one or more relationships between events on the part of an enterprise and the overall market. For example, particular embodiments may generate a sales volume forecast by determining a historical correlation between sales volume and the price difference between asking price and coinciding market price and applying that historical correlation to a hypothetical price difference between asking price and coinciding market price. Such an approach may provide more accurate sales volume forecasts, which in turn may improve one or more aspects of business planning. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
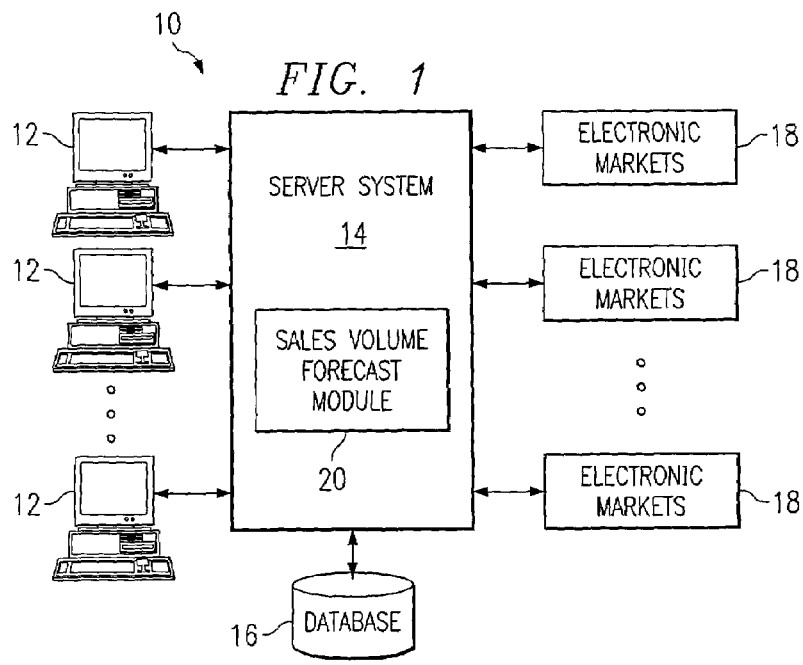
FIG. 1 illustrates an example system for generating a sales volume forecast.

FIG. 1 illustrates an example system 10 for generating a sales volume forecast. System 10 may include one or more client systems 12 coupled to a server system 14, which may in turn be coupled to database system 16 and one or more electronic markets 18. Client systems 12, server system 14, database system 16, and electronic markets 18 may be coupled to each other using links that may each include one or more computer buses, local area networks (LANs), metropolitan area networks (MANs), wide area networks (WANs), portions of the Internet, or any other appropriate wireline, optical, wireless, or other links. Server system 14 may support a sales volume forecast module 20, which may generate sales volume forecasts using inputs received from users via client systems 14 and information from database system 16 and electronic markets 18. Sales volume forecast module 20 may be implemented using software executed at one or more computers associated with server system 14. Each such computer may include one or more suitable input devices, output devices, mass storage media, processors, memory, communications interfaces, or other components for receiving, processing, storing, and communicating information according to the operation of system 10. Database system 16 may include any suitable data storage media, and reference to "database" is meant to encompass all such data storage media and associated data structures as are appropriate. Electronic markets 18 may include any suitable markets supporting transactions between buyers and sellers. For example, an electronic market 18 may include an open mercantile exchange where commodity futures contracts for one or more commodities are bought and sold.

To generate a sales volume forecast, sales volume forecast module 20 may determine a historical correlation between sales volume and the price difference between asking price and coinciding market price and apply the historical correlation to a hypothetical price difference between asking price and coinciding market price. Sales volume forecast module 20 may generate sales volume forecasts particular to an item and an enterprise. Items may include raw materials, component parts, products, or other items that may be the subject of transactions between buyers and sellers and may include lots, blocks, bundles, bushels, or other suitable units of one or more individual items. In addition or as an alternative, sales volume forecast module 20 may, in particular embodiments, generate sales volume forecasts that span a number of items, a number of enterprises, or both.

Sales volume forecast module 20 may determine a historical correlation between sales volume and the price difference between asking price and coinciding market price using any suitable technique. In particular embodiments, for example, sales volume forecast module 20 may use a mathematical regression technique to determine a historical correlation between sales volume and the price difference between asking price and coinciding market price, which correlation may be represented as an equation of any suitable order including any suitable number of independent and dependent variables. The data used to determine such a correlation may include a number of data units that each reflect a volume of sales for an item and an enterprise over a period of time and a corresponding price difference between an asking price and a coinciding market price. Although data units are described as an example, data used to determine a historical correlation between asking price and coinciding market price may include any suitable data in any suitable format accessed in any suitable manner. Such data may be contained within database system 16. In addition or as an alternative, such data may be stored by one or more electronic markets 18. The time periods over which sales volumes are reflected in such data units may vary in length from data unit to data unit and may, where appropriate, overlap.

Sales volumes reflected in data units used to determine a historical correlation between sales volume and the price difference between asking price and coinciding market price may include quantities of items that were sold. Where a generated sales volume forecast is particular to an item and an enterprise, such sales volumes may include quantities of the item that were sold by the enterprise. For example only and not by way of limitation, one data unit used to determine a historical correlation between sales volume and the price difference between asking price and coinciding market price may indicate that XYZ Corporation sold two thousand units of item A in July 2000 at an asking price that was five cents below a July 2000 market price for item A, another data unit may indicate that XYZ Corporation sold one thousand five hundred units of item A in August 2000 at an asking price seven cents below an August 2000 market price for item A, another data unit may indicate that XYZ Corporation sold two thousand five hundred units of item A in September 2000 at an asking price three cents below a September 2000 market price for item A, and so on.

Price differences reflected in data units used to determine a historical correlation between sales volume and the price difference between asking price and coinciding market price may include actual price differences, proportional price differences, or both. Asking prices on which such price differences are based may include prices asked for one or more items. Where appropriate, such asking prices may each include a combination of different asking prices, such as an average asking price over a period of time, across a number of different markets, or both. Where a generated sales volume forecast is particular to an item and an enterprise, such asking prices may include prices asked for the item by the enterprise.

Market prices on which such price differences are based may include any suitable market prices, such as futures contract prices. Additionally, market prices on which such price differences are based may, where appropriate, include a combination of different market prices, such as average market prices over periods of time, across a number of different markets, or both. For example only an not by way of limitation, one data unit used to determine a historical correlation between sales volume and the price difference between asking price and coinciding market price may indicate that XYZ Corporation sold two thousand units of item A in July 2000 at an asking price that was five cents below an expiration price for futures contracts for item A that expired in July 2000, another data unit may indicate that XYZ Corporation sold one thousand five hundred units of item A in August 2000 at an asking price seven cents below an expiration price for futures contracts for item A that expired in August 2000, another data unit may indicate that XYZ Corporation sold two thousand five hundred units of item A in September 2000 at an asking price three cents below an expiration price for futures contracts for item A that expired in September 2000, and so on. Although expiration prices of futures contracts are described as an example, market prices on which price differences reflected in data units used to determine a historical correlation between sales volume and the price difference between asking price and coinciding market price are based may include any suitable futures contract prices or other market prices.

A hypothetical price difference between asking price and coinciding market price to which a historical correlation determined by sales volume forecast module 20 may be applied may include a price difference between an asking price specified by a user and a coinciding market price. A market prices on which a hypothetical price difference is based may include any suitable market price, such as a current price for futures contracts set to expire on a date specified by a user or an associated date. For example, a user may specify a hypothetical asking price for an item and a future date (which may include a future period of time) for a sales volume forecast, and the market price on which the hypothetical price difference for the sales volume forecast is based may include a current price for futures contracts set to expire on the specified future date or a date associated with the specified future date. Although current prices for futures contracts set to expire on a specified future date or associated date are described as an example, the present invention contemplates hypothetical price differences based on any suitable futures contracts prices or other market prices. A current market price may include a market price as of the close of the previous business day. Market prices on which hypothetical price differences are based may include a combination of market prices, such as an average market price over a period of time, across a number of different markets, or both. Market prices on which hypothetical price differences are based may be stored by one or more electronic markets and accessed by sales volume forecast module 20 in any suitable manner. In addition or as an alternative, such market prices may be contained within database system 16.

Sales volume forecasts generated by sales volume forecast module 20 may be used in any suitable manner. For example only and not by way of limitation, sales volume forecast module 20 may generate for a gasoline producer sales volume forecasts for different types of gasoline (such as various grades of unleaded gasoline, diesel, aviation fuel, etc.) that may be produced from one or more types of petroleum. Data for generating these forecasts may include data reflecting sales volume and asking price history for the gasoline producer and data reflecting historical, current, and future market prices for the different types of gasoline. Using the generated sales volume forecasts, the gasoline producer may determine how much of each type of gasoline to produce using the petroleum supplies of the gasoline producer and how much of the petroleum supplies of the gasoline producer to trade with other, competing gasoline producers to increase profits realized by the gasoline producer in the future.

Figure 2:
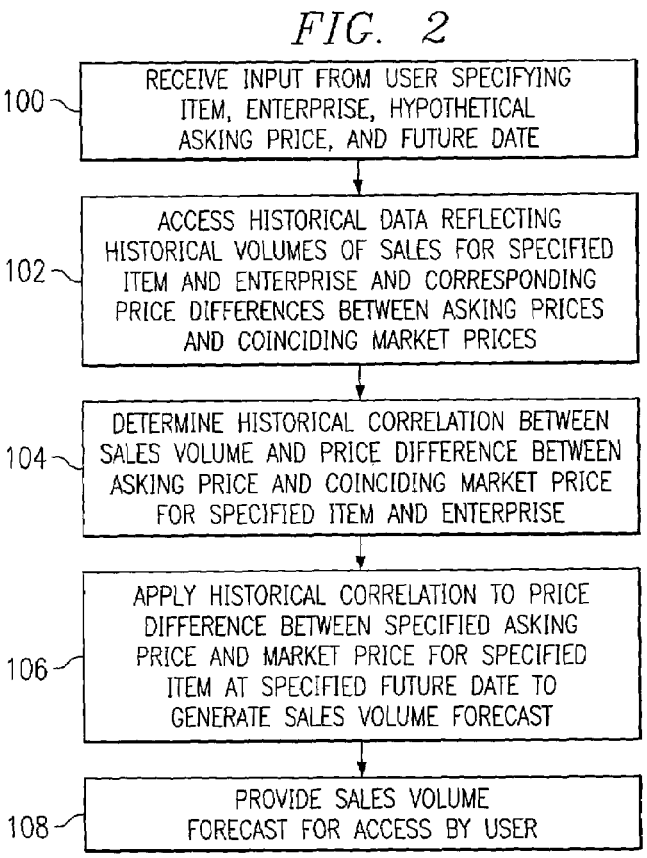
FIG. 2 illustrates an example method for generating a sales volume forecast.

FIG. 2 illustrates an example method for generating a sales volume forecast. The method begins at step 100, where sales volume forecast module 20 receives input from a user specifying an item, enterprise, hypothetical asking price, and future date. As described above, such input may be received from the user via a client system 12 coupled to server system 14. Although sales volume forecast module 20 is described as performing various tasks associated with generating a sales volume forecast, any suitable component associated with system 10 may perform one or more of these tasks. Although user input specifying an item, enterprise, hypothetical asking price, and future date is described as an example, any suitable input may be used to generate a sales volume forecast. For example, sales volume forecast module 20 may generate sales volume forecasts for a particular enterprise without users providing input specifying an enterprise. At step 102, sales volume forecast module 20 accesses historical data reflecting historical volumes of sales for the specified item and enterprise and corresponding price differences between asking prices and coinciding market prices. The historical data accessed by sales volume forecast module 20 may include all available data reflecting historical sales volumes and corresponding price differences. In addition or as an alternative, such historical data may include data reflecting historical sales volumes and corresponding price differences over a particular period of time. As described above, sales volume forecast module 20 may access historical data in any suitable manner, and all or certain portions of such data may be contained within database system 16, stored by one or more electronic markets 18, or both.

At step 104, sales volume forecast module 20 determines a historical correlation between sales volume and the price difference between asking price and coinciding market price for the specified item and enterprise. As described above, this correlation may be determined using a mathematical regression technique to determine the historical correlation, which may be represented as an equation of any suitable order including any suitable number of independent and dependent variables. At step 106, sales volume forecast module 20 applies the determined historical correlation to the price difference between the specified asking price and a market price for the specified item at the specified future date to generate a sales volume forecast. As described above, the market price on which the price difference to which the determined historical correlation is applied may include any suitable market price. For example, the market price may include a current price for futures contracts for the specified item set to expire on the specified date or an associated date. At step 108, sales volume forecast module 20 provides the generated sales volume forecast for access by one or more users, and the method ends.

Although the present invention has been described with several embodiments, divers changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A computer-implemented system for generating a sales volume forecast, the system comprising one or more computer systems operable to:
   receive user input specifying a hypothetical asking price and a future date;
   for each of a plurality of past time periods, access historical data reflecting a sales volume for an item over the past time period and a corresponding price difference between an asking price and a coinciding market price for the item, the price difference also being associated with the past time period;
   determine a historical correlation for the item between sales volume and price difference between asking price and coinciding market price;
   access market data reflecting a future market price for the item, the future market price being associated with the specified future date;
   determine a price difference between the specified hypothetical asking price and the future market price for the item;
   apply the determined historical correlation to the determined price difference to generate a sales volume forecast; and
   provide the generated sales volume forecast for access by a user.

2. The system of claim 1, further operable to:
   receive user input specifying one of a plurality of enterprises for which historical data is accessible, wherein the historical data and the determined historical correlation are associated with the specified enterprise.

3. The system of claim 1, further operable to receive user input specifying the item, the item being one of a plurality of items for which historical data is accessible.

4. The system of claim 1, wherein the coinciding market prices on which price differences are based comprise expiration prices for futures contracts for the item.

5. The system of claim 1, wherein the specified future date comprises a future time period.

6. The system of claim 1, wherein the future market price for the item comprises a current price for futures contracts for the item set to expire in association with the specified future date.

7. The system of claim 1, wherein:
   the historical data is contained within a database system directly accessible to the one or more computers; and
   the market data reflecting the future market price for the item is contained within one or more database systems associated with one or more electronic markets.

8. The system of claim 1, further operable to use a mathematical regression technique to determine the historical correlation between sales volume and price difference between asking price and coinciding market price.

9. The system of claim 1, wherein the price difference between an asking price and a coinciding market price is either actual or proportional to either the asking price or the coinciding market price.

10. A method for generating a sales volume forecast, comprising:
    receiving user input specifying a hypothetical asking price and a future date;
    for each of a plurality of past time periods, accessing historical data reflecting a sales volume for an item over the past time period and a corresponding price difference between an asking price and a coinciding market price for the item, the price difference also being associated with the past time period;
    determining a historical correlation for the item between sales volume and price difference between asking price and coinciding market price;
    accessing market data reflecting a future market price for the item, the future market price being associated with the specified future date;

determining a price difference between the specified hypothetical asking price and the future market price for the item;

applying the determined historical correlation to the determined price difference to generate a sales volume forecast; and providing the generated sales volume forecast for access by a user.

11. The method of claim 10, wherein the historical data and the determined historical correlation are associated with one of a plurality of enterprises for which historical data is accessible, the enterprise being specified by user input.

12. The method of claim 10, further comprising receiving user input specifying the item, the item being one of a plurality of items for which historical data is accessible.

13. The method of claim 10, wherein the coinciding market prices on which price differences are based comprise expiration prices for futures contracts for the item.

14. The method of claim 10, wherein the specified future date comprises a future time period.

15. The method of claim 10, wherein the future market price for the item comprises a current price for futures contracts for the item set to expire in association with the specified future date.

16. The method of claim 10, wherein:
the historical data is contained within a directly accessible database system; and
the market data reflecting the future market price for the item is contained within one or more database systems associated with one or more electronic markets.

17. The method of claim 10, wherein a mathematical regression technique is used to determine the historical correlation between sales volume and price difference between asking price and coinciding market price.

18. The method of claim 10, wherein the price difference between an asking price and a coinciding market price is either actual or proportional to either the asking price or the coinciding market price.

19. Software for generating a sales volume forecast, the software being embodied in computer-readable media and when executed operable to:

receive user input specifying a hypothetical asking price and a future date;

for each of a plurality of past time periods, access historical data reflecting a sales volume for an item over the past time period and a corresponding price difference between an asking price and a coinciding market price for the item, the price difference also being associated with the past time period;

determine a historical correlation for the item between sales volume and price difference between asking price and coinciding market price;

access market data reflecting a future market price for the item, the future market price being associated with the specified future date;

determine a price difference between the specified hypothetical asking price and the future market price for the item;

apply the determined historical correlation to the determined price difference to generate a sales volume forecast; and provide the generated sales volume forecast for access by a user.

20. The software of claim 19, wherein the historical data and the determined historical correlation are associated with one of a plurality of enterprises for which historical data is accessible, the enterprise being specified by user input.

21. The software of claim 19, operable to receive user input specifying the item, the item being one of a plurality of items for which historical data is accessible.

22. The software of claim 19, wherein the coinciding market prices on which price differences are based comprise expiration prices for futures contracts for the item.

23. The software of claim 19, wherein the specified future date comprises a future time period.

24. The software of claim 19, wherein the future market price for the item comprises a current price for futures contracts for the item set to expire in association with the specified future date.

25. The software of claim 19, wherein:
the historical data is contained within a directly accessible database system; and
the market data reflecting the future market price for the item is contained within one or more database systems associated with one or more electronic markets.

26. The software of claim 19, operable to use a mathematical regression technique to determine the historical correlation between sales volume and price difference between asking price and coinciding market price.

27. The software of claim 19, wherein the price difference between an asking price and a coinciding market price is either actual or proportional to either the asking price or the coinciding market price.

28. A system for generating a sales volume forecast, comprising:

means for receiving user input specifying a hypothetical asking price and a future date;

means for accessing, for each of a plurality of past time periods, historical data reflecting a sales volume for an item over the past time period and a corresponding price difference between an asking price and a coinciding market price for the item, the price difference also being associated with the past time period;

means for determining a historical correlation for the item between sales volume and price difference between asking price and coinciding market price;

means for accessing market data reflecting a future market price for the item, the future market price being associated with the specified future date;

means for determining a price difference between the specified hypothetical asking price and the future market price for the item;

means for applying the determined historical correlation to the determined price difference to generate a sales volume forecast; and means for providing the generated sales volume forecast for access by a user.

29. A computer-implemented system for generating a sales volume forecast, the system comprising one or more computer systems operable to:

receive user input specifying a hypothetical asking price, a future date, and an item, the item being one of a plurality of items for which historical data is accessible;

for each of a plurality of past time periods, access historical data associated with an enterprise and reflecting a sales volume for an item over the past time period and a corresponding price difference between an asking price and a coinciding market price for the item, the price difference also being associated with the past time period, the coinciding market price comprising expiration prices for futures contracts for the item;

determine a historical correlation for the item between sales volume and price difference between asking price and coinciding market price, the historical correlation being associated with the enterprise;

access market data reflecting a future market price for the item, the future market price comprising a current price for futures contracts for the item set to expire in association with the specified future date;

determine a price difference between the specified hypothetical asking price and the future market price for the item;

apply the determined historical correlation to the determined price difference to generate a sales volume forecast; and provide the generated sales volume forecast for access by a user.

\* \* \* \* \*